(12) United States Patent
Wang et al.

(10) Patent No.: US 10,785,074 B1
(45) Date of Patent: Sep. 22, 2020

(54) CROSS-PRODUCT DETECTION METHOD FOR A NARROWBAND SIGNAL UNDER A WIDE RANGE OF CARRIER FREQUENCY OFFSET (CFO) USING MULTIPLE FREQUENCY BINS

(71) Applicant: Hong Kong Applied Science and Technology Research Institute Company, Limited, Hong Kong (HK)

(72) Inventors: Jianhui Wang, Hong Kong (HK); Tao Li, Hong Kong (HK)

(73) Assignee: Hong Kong Applied Science and Technology Research Institute Company, Limited, Hong Kong (HK)

( * ) Notice: Subject to any disclaimer, the term of this patent is extended or adjusted under 35 U.S.C. 154(b) by 0 days.

(21) Appl. No.: 16/861,370

(22) Filed: Apr. 29, 2020

(51) Int. Cl.
*H04L 27/20* (2006.01)
*H04B 7/0456* (2017.01)
*H04L 27/00* (2006.01)
*H04L 27/227* (2006.01)

(52) U.S. Cl.
CPC ....... *H04L 27/2082* (2013.01); *H04B 7/0456* (2013.01); *H04L 27/0014* (2013.01); *H04L 27/2278* (2013.01); *H04L 2027/0036* (2013.01)

(58) Field of Classification Search
CPC ........ H04B 2201/70701; H04B 1/7093; H04B 1/709; H04B 7/0456; H04L 27/2082; H04L 27/0014; H04L 27/2278; H04L 27/2675; H04L 27/2657; H04L 27/2663; H04L 7/0087
See application file for complete search history.

(56) References Cited

U.S. PATENT DOCUMENTS

| | | | | |
|---|---|---|---|---|
| 4,267,580 | A | * | 5/1981 | Bond ............... G06G 7/1907 367/100 |
| 4,910,470 | A | | 3/1990 | Borth et al. |
| 5,732,111 | A | | 3/1998 | Walley |
| 5,953,370 | A | * | 9/1999 | Durrant ............ H04B 1/707 375/140 |
| 9,191,260 | B1 | * | 11/2015 | Grund ............. G06K 9/0055 |
| 9,819,370 | B2 | * | 11/2017 | Ishikawa ......... H03F 1/3241 |
| 9,912,511 | B2 | | 3/2018 | Zhao et al. |
| 9,912,512 | B2 | | 3/2018 | Zhao et al. |

(Continued)

*Primary Examiner* — Khanh C Tran
(74) *Attorney, Agent, or Firm* — gPatent LLC; Stuart T. Auvinen

(57) ABSTRACT

A synchronizer generates cross-products of In-phase (I) and Quadrature (Q) samples and stores the sign bits for the sine and cosine cross-products. The sign bits are compared to a local reference of a frame-start bit-sequence and the compare results accumulated as I and Q correlations for symbol and half-symbol sampling. Linear combinations of the accumulated I and Q correlations for the symbol and half-symbol sampling generate linear combination results for frequency bins that peak at a different implied Carrier Frequency Offset (CFO) settings. The maximum of the linear combination results is selected and the implied CFO setting for that frequency bin is applied to a demodulator to adjust the receiver's CFO setting and bit synchronization. Computational complexity is reduced since only the sign bit of each cross-product is retained for correlation with the frame-start bit-sequence. Linear combinations can support a wide CFO range.

20 Claims, 7 Drawing Sheets

(56) References Cited

U.S. PATENT DOCUMENTS

| | | | |
|---|---|---|---|
| 2012/0106678 A1* | 5/2012 | Currivan | H04L 27/0014 375/320 |
| 2012/0169542 A1* | 7/2012 | Mathews | H04B 1/709 342/450 |
| 2013/0195229 A1 | 8/2013 | Cheng et al. | |
| 2019/0028316 A1 | 1/2019 | Chu et al. | |
| 2019/0166450 A1 | 5/2019 | Fort | |
| 2019/0207743 A1 | 7/2019 | Chu et al. | |

* cited by examiner

US 10,785,074 B1

CROSS-PRODUCT DETECTION METHOD FOR A NARROWBAND SIGNAL UNDER A WIDE RANGE OF CARRIER FREQUENCY OFFSET (CFO) USING MULTIPLE FREQUENCY BINS

FIELD OF THE INVENTION

This invention relates to communication systems, and more particularly to detectors for narrow-band signals having a wide range of Carrier Frequency Offsets (CFO).

BACKGROUND OF THE INVENTION

Communication systems can include transceivers that have both a transmitter and a receiver. Some applications require low power consumption, such as for Internet of Things (IoT).

FIG. 1 shows a low-power receiver. Radio-Frequency (RF) front end 102 receives wireless signals from an antenna and may amplify low-power signals and convert the signals to an intermediate frequency (IF), then apply the amplified IF voltage to Analog-to-Digital Converter (ADC) 104, which generates a digital signal. Down-mixer 106 mixes a local clock with the digital signal from ADC 104 to shift the frequency from the IF range to baseband.

Demodulator 110 demodulates the digital signal by extracting some parameters of the baseband signal, such as phase, frequency and amplitude, to recover the transmitted data. Deframer 112 removes frame sequences such as start bit sequences and preambles to output the received data stream. Further processing can occur downstream to examine packet headers and perform error-correction for higher protocol levels.

Detector 100 examines and processes the baseband signal output by down-mixer 106 to adjust the timing of demodulator 110. The local clock used by down-mixer 106 may not exactly match the transmitter's clock. When the clock mismatch is significant, data may be detected incorrectly.

The start of each frame typically has a preamble with a known bit sequence, such as 10101010, that is useful for adjusting the receiver's timing so that the data that follows the frame-start bit-sequence can be more accurately read.

Detector 100 examines the signal received by down-mixer 106 and searches for the frame-start bit-sequence. When this frame-start bit-sequence is detected by detector 100, then the received signal containing the frame-start bit-sequence is processed to determine whether a different clock frequency and symbol timing would better receive the frame-start bit-sequence. The clock offset and symbol timing that produce the strongest signal for the frame-start bit-sequence are sent to demodulator 110 and used to demodulate the data that follows the frame-start bit-sequence in the current frame.

Thus detector 100 detects timing mismatches in the frame-start bit-sequence and then adjusts the timing of demodulator 110 to correct for the detected timing mismatch when the data that follows the frame-start bit-sequence is extracted by demodulator 110.

The clock-frequency difference or carrier offset between the transmitter and the receiver is known as Carrier Frequency Offset (CFO). Detector 100 detects and corrects for this CFO. Ideally, detector 100 is able to correct for a wide range of CFO. However, low-power receivers need to reduce computational complexity of detector 100. Memory reads and writes that occur when detector 100 is processing data can increase power consumption. However, low-power transmitters send weak signals that are hard to detect. A generic Digital-Signal Processor (DSP) may consume too much power or not be able to process the high bit rates.

When the CFO range is wide, computational complexity increases. Phase discriminators using Coordinate Rotation Digital Computer (CORDIC) functions have a high complexity and can be vulnerable to phase ambiguity. Simpler phase discriminators typically operate over a narrow range of CFO.

What is desired is a low-power, low-complexity detector that can operate over a wide range of CFO. A frame-start bit-sequence detector that performs binary correlation with a simple phase discriminator that does not require high power or high computational complexity is desirable.

DETAILED DESCRIPTION

The present invention relates to an improvement in low-power detectors. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that simple phase discriminators such as cross-products can operate well over a small CFO sub-range, but operate poorly over a wide CFO range. The inventors realize that low-complexity cross-product phase discriminators can be used and their results correlated with the frame-start bit-sequence. Linear combinations of the correlations results can produce results for several possible CFO settings, or frequency bins. The frequency bin with the highest correlated result can be used to select a bit sync estimate and a CFO estimate that can adjust the receiver's clock to correct for the actual CFO.

Thus the CFO range is divided into frequency bins after correlation. Only one correlation channel is needed along with a linear combination. A low-complexity detector can be achieved by dividing the CFO range into bins after correlation rather than before correlation. Although the cross-product discriminator is useful over a small CFO range when used separately, the linear combination and correlation overcome the limited CFO range of the phase discriminator.

Figure 1:
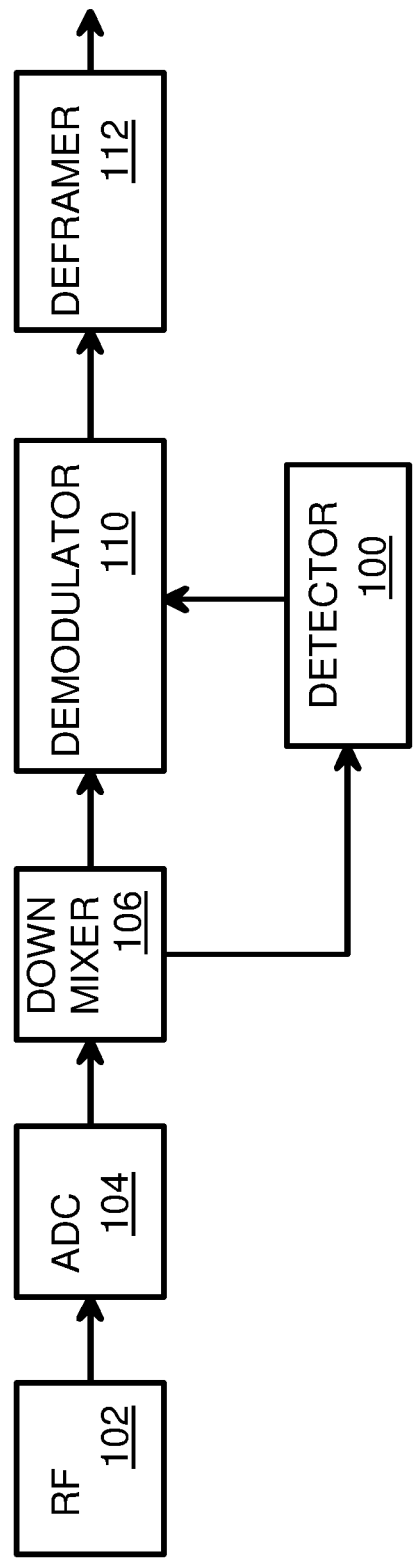
FIG. 1 shows a low-power receiver.
Figure 2:
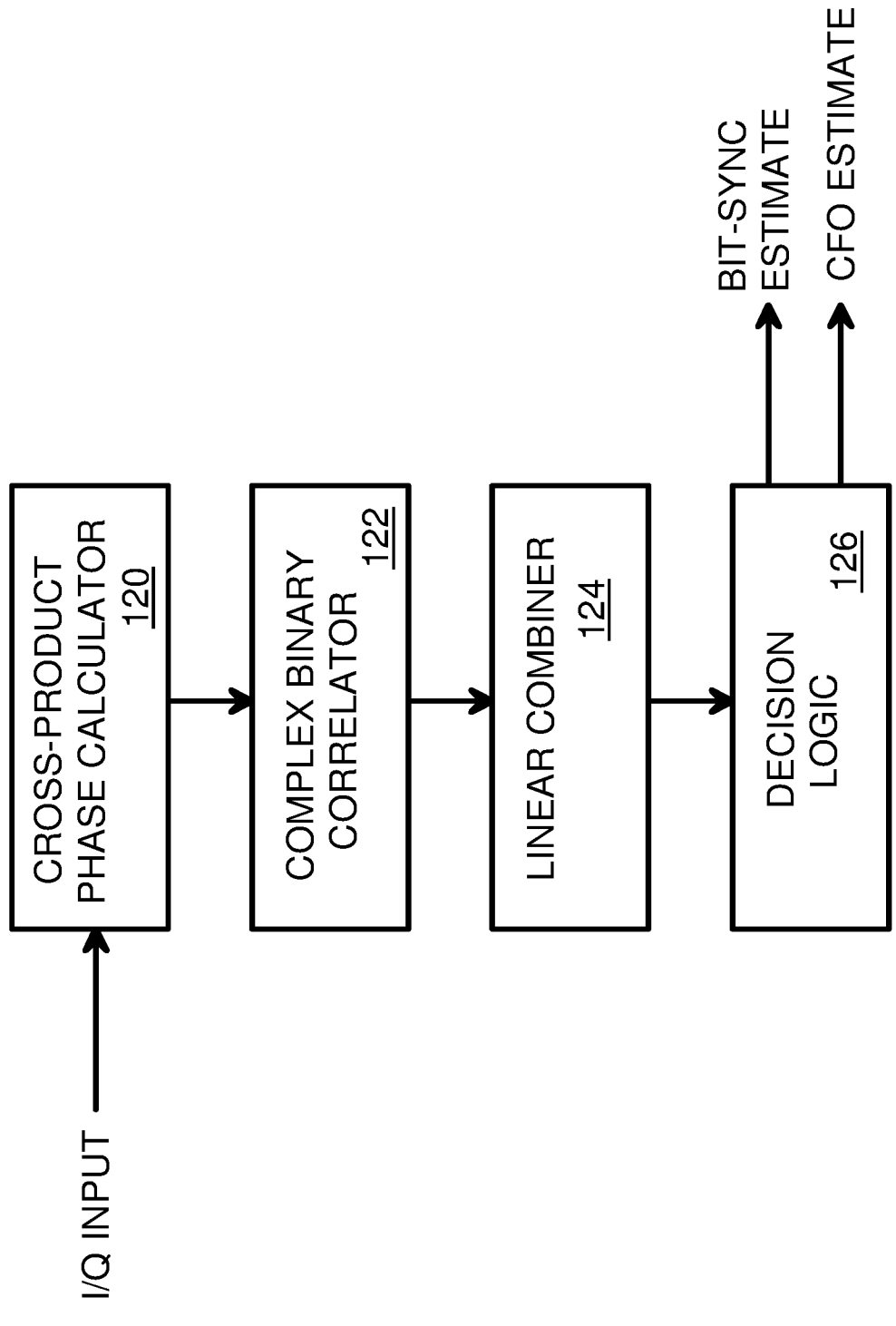
FIG. 2 is a block diagram of a wide-CFO-range detector.

FIG. 2 is a block diagram of a wide-CFO-range detector. Down-mixer 106 (FIG. 1) produces a stream of samples with In-phase (I) and Quadrature (Q) values for each sample. Detector 100' receives these I,Q sample values and calculates cross products using cross-product phase calculator 120. The leading bit or sign bit of the cross-products are stored for the sequence of samples.

Complex binary correlator 122 compares the sequence of sign bits to a local copy or local reference of the frame-start bit-sequence to determine how closely the cross-product signs match the expected frame-start bit-sequence. Both the sine and cosine cross-products are separately accumulated. Only the polarity of the cross products, indicated by the sign bits, are correlated and accumulated, not the full values. Using only the MSB or sign bits significantly reduces computational complexity.

Then linear combiner 124 combines the accumulated correlations with other accumulated correlations that have different cross-product intervals to produce frequency bins for different pre-set CFO values. These frequency bin results are then compared to bin thresholds by decision logic 126 and the bin with the largest value over the threshold, which represents the largest signal, is used to select the CFO estimate and bit-sync to remove the CFO and adjust the timing.

Decision logic 126 outputs a bit-sync estimate to demodulator 110 (FIG. 1) and the CFO estimate to down-mixer 106 (FIG. 1). The bit-sync estimate is a value which indicates the start point of a symbol and is used to adjust the input of demodulator 110 so that demodulator 110 is triggered at the start point of each symbol. The CFO estimate is a value which indicates the size of CFO. The CFO estimate is mainly used by down-mixer 106 to remove the CFO by adjusting a local reference frequency, so that demodulator 110 can use CFO-free samples to restore data.

Figure 3:
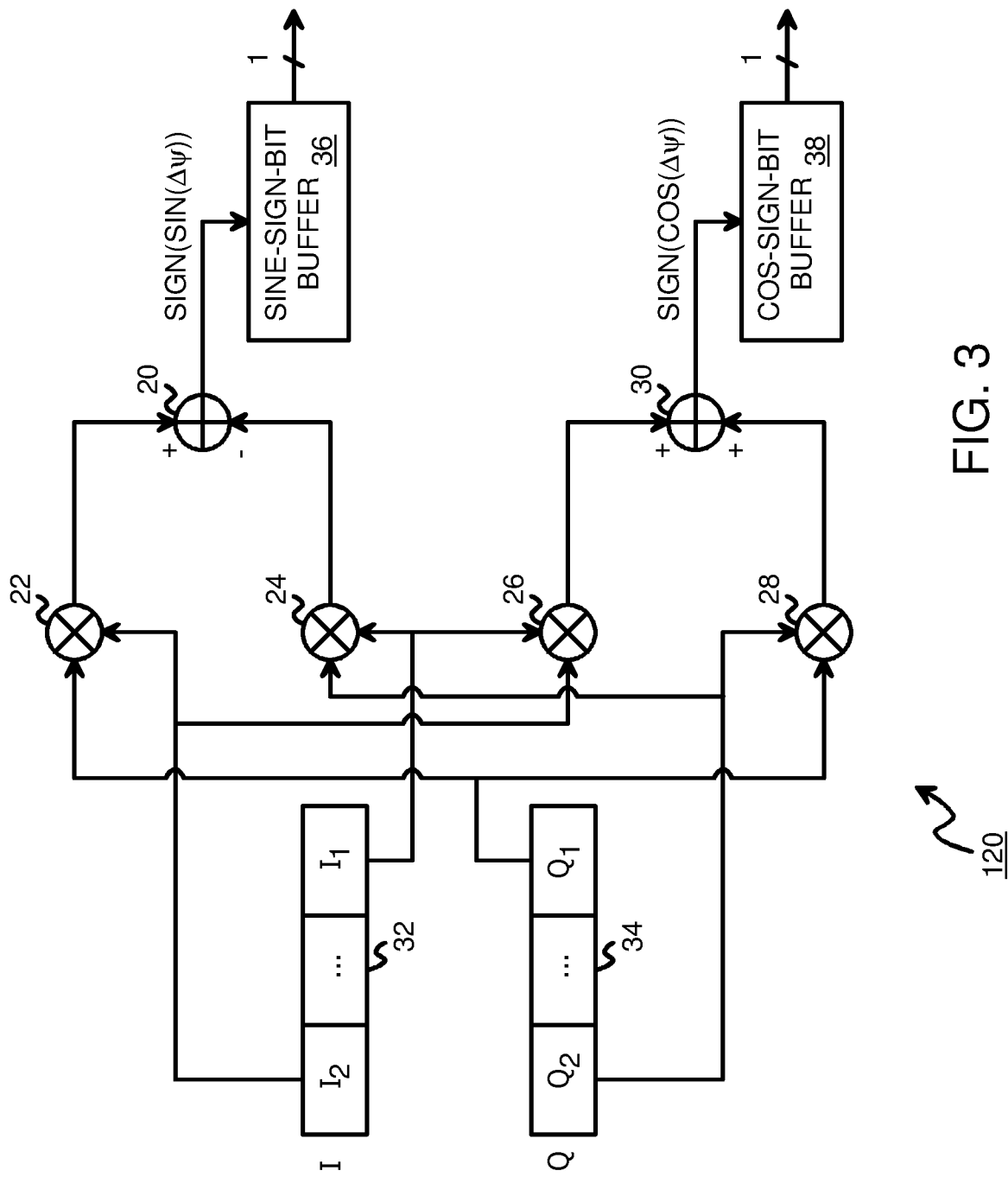
FIG. 3 shows the cross-product phase calculator in more detail.

FIG. 3 shows the cross-product phase calculator in more detail. The In-phase I samples I1, ... I2, ... are stored in I sample buffer 32 while the Quadrature Q samples Q1, ... Q2, ... are stored in Q sample buffer 34. There may be other intervening samples between I1 and I2, and also between Q1 and Q2. The number of intervening samples can depend on the baseband design, such as the modulation index, or number of samples per symbol, where I1,Q1 and I2,Q2 are from consecutive symbols, or from consecutive half symbols, with intervening samples, when there are multiple samples per symbol. Q2 can be received before Q1.

For example, when a symbol corresponds to one transmitted bit, and the symbols are transmitted at 1 Mbits/sec, the Over-Sampling Ratio (OSR) is 16, so 16 samples are sampled by receiver's ADC for each symbol. The sample rate is 16 M and the symbol rate is 1 M. There are 15 samples between Q1 and Q2 for an OSR correlation and 15 samples between Q1 and Q2 for an OSR/2 correlation.

The interval between Q1 and Q2 is selected to make sure that the sine cross-product has a large absolute value which requires the phase difference of Q1 and Q2 close to $\pi/2$. So the number of samples between Q1 and Q2 depends on sampling frequency and modulation index. The closer the phase difference comes to $\pi/2$, the higher the Signal-to-Noise Ratio (SNR). Increasing SNR can improve detection performance.

The samples from buffers 32, 34 are multiplied by multipliers 22, 24, 26, 28 and then the products summed by adders 20, 30. The Most-Significant-Bit (MSB) from adder 20 is stored in sine sign-bit buffer 36 as the sign bit of the sine cross-product. The sine sign bit indicates when the sine wave is above the x-axis and when the sine wave is below the x-axis. The sign bit represents the direction of the phase difference, and also can be seen as a simplified phase difference. Sign bit '0' corresponds to a positive phase difference, and sign bit '1' corresponds to a negative phase difference.

Multiplier 22 multiplies I2 and Q1 to get I2*Q1, while multiplier 24 multiplies Q2 and I1, to get the product Q2*I1. Adder 20 subtracts the product from multiplier 24 from the product from multiplier 22 to obtain the sine cross-product (I2*Q1−Q2*I1). The LSB's from adder 20 are discarded and only the MSB from adder 20 is retained and stored in sine sign-bit buffer 36. This sign bit indicates the current sign of the sine wave.

Multiplier 26 multiplies I2 and I1 to get I2*I1, while multiplier 28 multiplies Q2 and Q1, to get the product Q2*Q1. Adder 30 adds the product from multiplier 26 and the product from multiplier 28 to obtain the cosine cross-product (I2*I1+Q2*Q1). The MSB from adder 30 is stored in cosine sign-bit buffer 38 as the sign bit of the cosine cross-product. This sign bit indicates the sign of cosine function of the phase difference, a simplified phase difference.

Cross-product phase calculator 120 outputs the sign bits from buffers 36, 38, which are simplified phase differences. Since these sign bits represent the polarity of the received sine and cosine functions, a sequence of these sign bits shows when these sine and cosine functions switch polarity or cross the x-axis. Thus these sign bits represent the phase differences of the I,Q input samples.

For example, 1,1 is a negative sine and negative cosine, 1,0 is a negative sine and positive cosine, 0,0 is positive sine and positive cosine. The sine sign-bit sequence 1100 and the cosine sign-bit sequence 1000 indicate a crossing of the x-axis by the cosine wave in the second sample and by the sine wave in the third sample. The timing of these polarity changes can be used to estimate the bit-sync.

Figure 4:
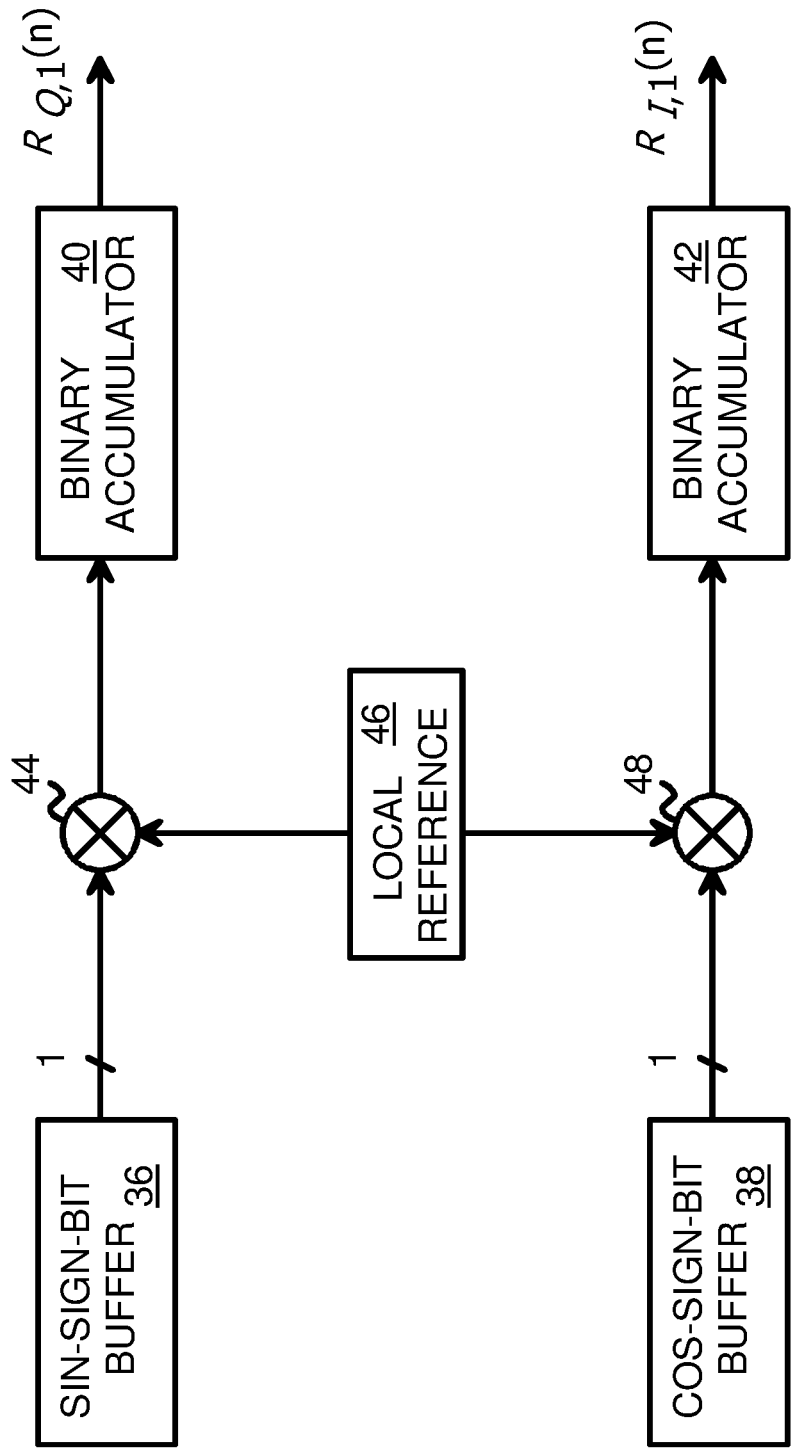
FIG. 4 shows the complex binary correlator in more detail.

FIG. 4 shows the complex binary correlator in more detail. The sine sign bits generated by cross-product phase calculator 120 are stored in sine sign-bit buffer 36 as a sequence of sign bits that are made available to complex binary correlator 122. These sign bits are multiplied by local reference 46 using multiplier 44 and the result accumulated by Q binary accumulator 40. The accumulated result is $R_{Q,1}(n)$.

Local reference 46 is a local copy of the frame-start bit-sequence that is expected, such as 10101010 (base 1 M/sec signal) or for an OSR of 8: 1111111100000000111111110000000011111110000000-01111111100000000

Local reference 46 is stored or generated on the receiver. When the frame-start bit-sequence is properly received from the transmitter, such as when there is zero phase delay between the transmitter and receiver clocks, and the CFO is close to zero, the sine sign bit will match the bit from local reference 46 in the corresponding sequence, and the accumulated value in Q binary accumulator 40 will be large.

The cosine sign bits generated by cross-product phase calculator 120 are stored in cosine sign-bit buffer 38 as a sequence of sign bits. These sign bits are multiplied by local reference 46 using multiplier 48 and the result accumulated by I binary accumulator 42. The accumulated result is $R_{I,1}(n)$.

When the frame-start bit-sequence is properly received, with no phase delay between the transmitter and receiver clocks, the cosine sign bit will mis-match the bit from local reference 46 in the corresponding sequence, and the accumulated value in I binary accumulator 42 will be small. However, when the CFO introduce a phase difference of $\pi/2$, then the frame-start bit-sequence will also be rotated by $\pi/2$, and the cosine sign bits will match the local reference but the sine sign bits will mismatch. Then the accumulated result in I binary accumulator 42 will be a large negative value and the accumulated result in Q binary accumulator 40 will be small.

Figure 5:
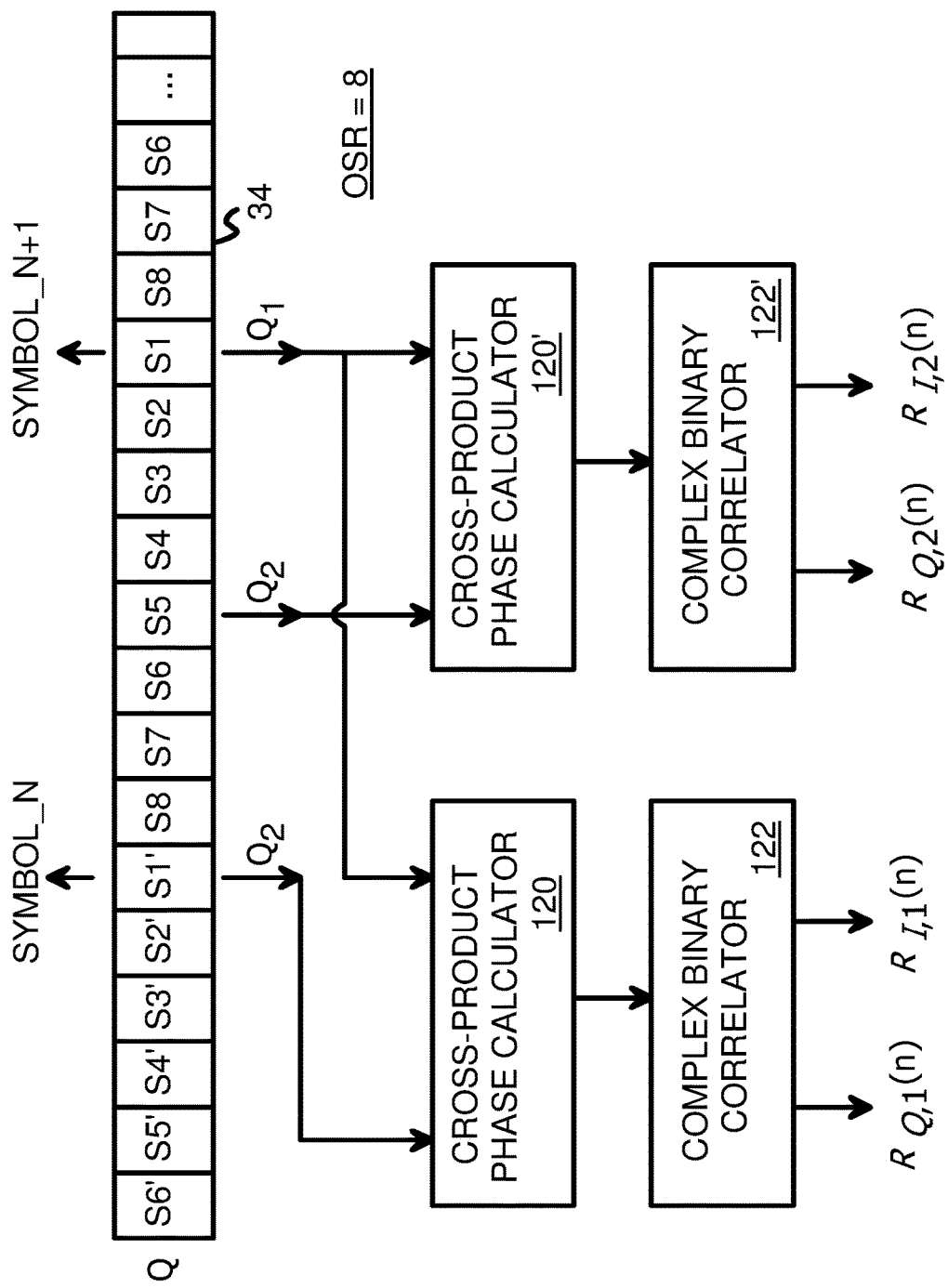
FIG. 5 highlights correlated cross-products generated from two sampling time intervals.

FIG. 5 highlights correlated cross-products generated from two sampling time intervals. During a first pass, Q samples S1 an S1' from buffer 34 are selected and input to cross-product phase calculator 120 as the Q1 and Q2 values (FIG. 3). I1 and I2 are selected from buffer 32 in a similar manner. Cross-product phase calculator 120 generates the cross products and truncates them to the sign bits that are correlated and accumulated by complex binary correlator 122 to generate $R_{Q,1}(n)$, $R_{I,1}(n)$.

In this example, the OSR is 8, so there are 8 samples per symbol. Samples S1 and S1' are selected to be separated by the OSR, or 8 samples apart. Q1, Q2 are from adjacent symbols. Thus the $R_{Q,1}(n)$, $R_{I,1}(n)$ accumulated values are generated by selecting Q1, Q2 to match the OSR. The time interval between the samples Q1, Q2 is one symbol.

Cross-product phase calculator 120 and complex binary correlator 122 are used a second time, or parallel hardware is used. Q samples S1 an S5 from buffer 34 are selected and input to cross-product phase calculator 120' as the Q1 and Q2 values (FIG. 3). I1 and I2 are selected from buffer 32 in a similar manner. Cross-product phase calculator 120' generates the cross products and truncates them to the sign bits that are correlated and accumulated by complex binary correlator 122' to generate $R_{Q,2}(n)$, $R_{I,2}(n)$.

In this second pass cross-product phase calculator 120 selects Q1, Q2 (and I1, I2) that are from consecutive half-symbols, or OSR/2 apart. In this example of OSR=8, samples S1 and S5 are selected as being one half-symbol apart, or OSR/2=8/2=4 samples apart.

The cross-product on samples with the different time interval of OSR/2 generates $R_{Q,2}(n)$, $R_{I,2}(n)$ that need to be delayed by OSR/4 samples to align with $R_{Q,1}(n)$, $R_{I,1}(n)$.

Figure 6:
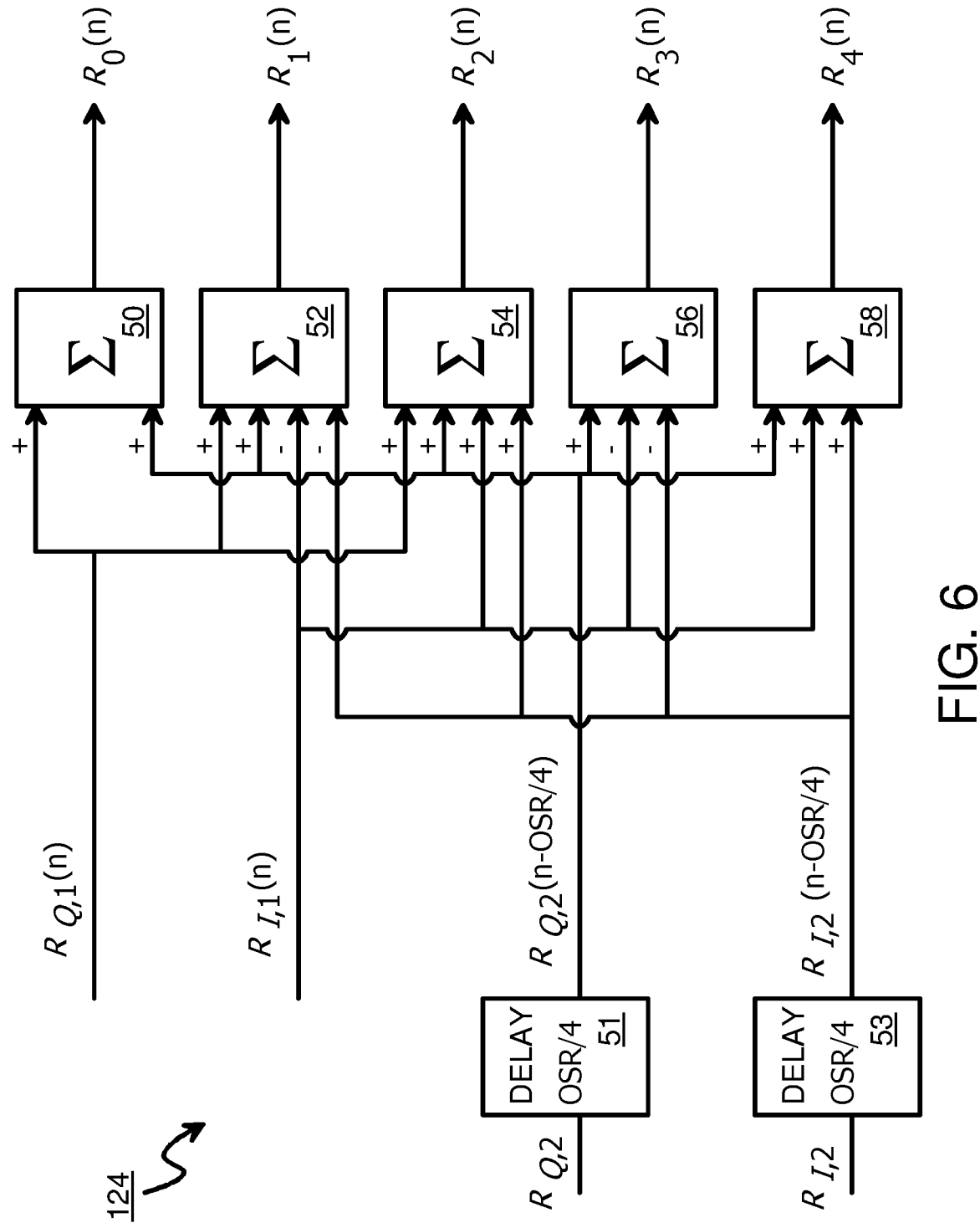
FIG. 6 shows the linear combiner in more detail.

FIG. 6 shows the linear combiner in more detail. When the I and Q samples selected from buffers 32, 34 are one symbol apart, the accumulated sine-bit matching result in Q binary accumulator 40, $R_{Q,1}(n)$, and the accumulated cosine-bit matching result in I binary accumulator 42, $R_{I,1}(n)$, are sent from complex binary correlator 122 to linear combiner 124 as $R_{Q,1}(n)$, $R_{I,1}(n)$.

On the second pass through cross-product phase calculator 120' and complex binary correlator 122', the I and Q samples selected from buffers 32, 34 are one-half symbol apart. Then the accumulated sine-bit matching result in Q binary accumulator 40 is $R_{Q,2}(n)$ and the accumulated cosine-bit matching result in I binary accumulator 42 is $R_{I,2}(n)$. These outputs are sent from complex binary correlator 122' to linear combiner 124 and delayed by OSR/4 by delay buffers 51, 53 to generate $R_{Q,2}(n\text{-}OSR/4)$, $R_{I,2}(n\text{-}OSR/4)$.

Summer 50 is an adder that generates the first frequency bin result, $R_0(n)$, as $R_{Q,1}(n)+R_{Q,2}(n\text{-}OSR/4)$. This first frequency bin result is large when there is zero phase/frequency offset, and the receiver clock is closely synced to the received bitstream.

Second summer 52 generates the second frequency bin result, $R_1(n)$, as $R_{Q,1}(n)+R_{Q,2}(n\text{-}OSR/4)-R_{I,1}(n)-R_{I,2}(n\text{-}OSR/4)$. This second frequency bin result is large when there is a small positive phase/frequency offset induced by CFO. When the CFO-induced phase difference error is equal to $\pi/4$, $R_1(n)$ achieves its peak. 125 kHz should be added to carrier frequency or intermediate frequency for a 1 M/sec symbol rate.

Third summer 54 generates the third frequency bin result, $R_2(n)$, as $R_{Q,1}(n)+R_{Q,2}(n\text{-}OSR/4)+R_{I,1}(n)+R_{I,2}(n\text{-}OSR/4)$. This third frequency bin result is large when there is a small negative phase difference error, such as $-\pi/4$, or $-125$ kHz of CFO for a symbol-length phase difference interval (1 M/sec symbol rate).

Fourth summer 56 generates the fourth frequency bin result, $R_3(n)$, as $R_{Q,2}(n\text{-}OSR/4)-R_{I,1}(n)-R_{I,2}(n\text{-}OSR/4)$. This fourth frequency bin result is large when there is a large phase difference offset, such as $\pi/2$, or 250 kHz for a symbol-length phase difference interval (at 1 M/sec symbol rate).

Fifth summer 58 generates the fifth frequency bin result, $R_4(n)$, as $R_{Q,2}(n\text{-}OSR/4)+R_{I,1}(n)+R_{I,2}(n\text{-}OSR/4)$. This fifth frequency bin result is large when there is a large negative phase difference offset, such as $-\pi/2$, or $-250$ kHz for a symbol-length phase difference interval (at 1 M/sec symbol rate).

The five frequency bin results $R_0(n)$ to $R_4(n)$, indicate how well the local reference matches the received frame-start bit-sequence for different amounts of introduced phase difference offset by CFO. When the received phase difference offset is small, $R_0(n)$ will be large and $R_1(n)$ and $R_2(n)$ smaller, with $R_3(n)$ and $R_4(n)$ being even smaller.

When the received phase difference offset is very large and negative, $R_0(n)$ will be small and $R_4(n)$ large, with $R_1(n)$ to $R_3(n)$ having small intermediate values. As the received phase difference is increased in the positive direction, the maximum of $R_0(n)$ to $R_4(n)$ will shift from $R_0(n)$, then to $R_1(n)$, and then to $R_3(n)$. As the received phase delay is increased in the negative direction, the maximum of $R_0(n)$ to $R_4(n)$ will shift from $R_0(n)$, then to $R_2(n)$, and then to $R_4(n)$.

Thus the maximum or peak of the five frequency bin results $R_0(n)$ to $R_4(n)$, indicate the magnitude and polarity of phase difference offset that best fits the local reference frame-start bit-sequence.

Figure 7:
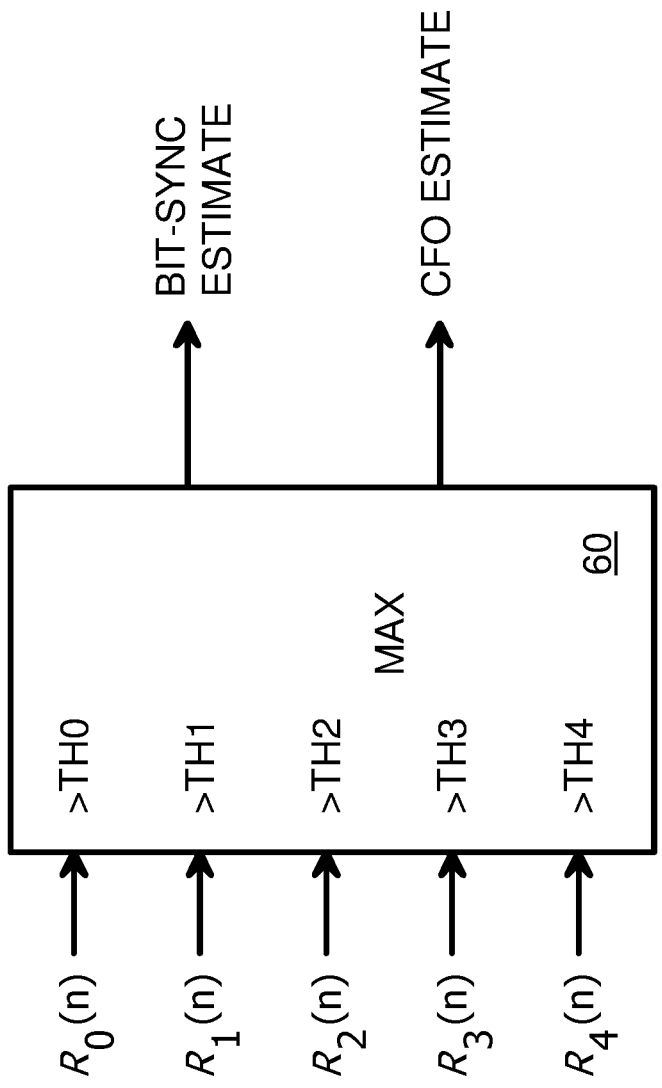
FIG. 7 shows the decision logic in more detail.

FIG. 7 shows the decision logic in more detail. The five frequency bin results $R_0(n)$ to $R_4(n)$ are sent from linear combiner 124 to decision logic 126. Each frequency bin result is compared to a threshold for that frequency bin. For example, first frequency bin result $R_0(n)$ is compared to first threshold TH0, while fifth frequency bin result $R_4(n)$ is compared to fifth threshold TH4. The excesses above these thresholds are compared and the frequency bin with the largest excess over its threshold is selected. The sample's position corresponding to the maximum value of $R_0(n)$ to $R_4(n)$ for this selected frequency bin is used as the bit-sync estimate. This bit-sync estimate is applied to demodulator 110 and used to adjust the time delay used to extract the data.

Maximum selector 60 can subtract each threshold from its frequency-bin input, and the differences compared to each other to find the maximum difference. The frequency bin with the maximum difference is encoded to the estimate the bit-sync.

The CFO estimate can be a more complex result, such as by using the excess amount of the frequency bin having the maximum excess. The CFO can be a coarse estimate.

When the decision logic has successfully completed, the position of I2 (or Q2) within buffers 32, 34 (FIG. 3) is the bit-sync estimate. The CFO (0, 125 kHz, $-125$ kHz, 250 kHz or $-250$ kHz) of the bin with the largest value is used as a coarse CFO estimate. The bit-sync estimate is used to set the start point of demodulation by demodulator 110 (FIG. 1), while CFO estimate is used by down-mixer 106.

The hardware complexity is reduced, since only 4 multipliers and 2 adders are used by cross-product phase calculator 120 that operate on the full width of the I and Q samples, such as 8 bits. Since only sign bits are retained in the cross-products, multipliers 44, 48 in linear combiner 124 only need to be 1-bit multipliers, rather than 8-bit or 32-bit multipliers. Also, I binary accumulator 42 and Q binary accumulator 40 can use smaller adders since single bits are being accumulated.

Cross-product phase calculator 120 selects samples S1, S1' from buffer 34 as samples Q1, Q2. These samples S1, S1' are one symbol apart, or OSR samples apart. Second cross-product phase calculator 120' selects samples S1, S5 from buffer 34 as samples Q1, Q2. These samples S1, S5 are one-half symbol apart, or OSR/2 samples apart. Q2 is received earlier than Q1 in cross-product phase calculator 120.

The sample clock is OSR times the frequency of a symbol clock. When the received CFO is close to zero, $R_0(n)$ has the largest peak, and a setting of CFO=0 is selected by decision logic 126.

When the CFO of the received data has a small positive CFO, then the second frequency bin result, $R_1(n)$, has the highest peak. Decision logic 126 sets the CFO estimate to $\pi/4$. The estimated CFO will be used to remove the CFO frequency.

When the CFO of the received data has a small negative CFO, then the third frequency bin result, $R_2(n)$, has the highest peak. Decision logic 126 sets the CFO estimate to $-\pi/4$.

When the CFO of the received data has a large positive CFO, then the fourth frequency bin result, $R_3(n)$, has the highest peak. Decision logic 126 sets the CFO estimate to $\pi/2$.

When the CFO of the received data has a large negative CFO, then the fifth frequency bin result, $R_4(n)$, has the highest peak. Decision logic 126 sets the CFO estimate to $-\pi/2$.

The cross-product and binary correlation modules run at a clock equal to the sampling frequency. A new correlation value is output once a new sample is input. First, S1', S5 and S1 are input to cross-product modules 120, 120'. Second, S8 (on the right of S1'), S4 and S8 (on the right of S1) are input to cross-product modules 120, 120'.

$R_0(n)$ to $R_4(n)$ used by decision logic 126 correspond to the same sample position, S1'. For example, assume that S2 is received earlier than S1 in FIG. 5. $R_0(n+1)$ to $R_4(n+1)$ are generated from S8 and the other S8 that is next to S1', so they correspond to S8. If decision logic 126 asserts success upon $R_i(n+1)$ (0=<i<=4), the position of S8 is output as the bit-sync result, and the CFO estimate is determined by i. Different correlation combinations correspond to different CFO bins, but they correspond to the same sample.

Alternate Embodiments

Several other embodiments are contemplated by the inventors. For example, there may be a different number of frequency bins. The frequency bins can correspond to the possible settings of the CFO adjustment to the demodulator. For example, when the possible CFO settings are 0, +125, -125, +250, -250 kHz, the five bins can be used as described earlier, but when the possible CFO settings are 0, +125, -125 kHz, then only the first 3 bins could be used. The locations within I sample buffer 32 and Q sample buffer 34 that the cross-products are selected from can be adjusted for different over-sampling ratios and modulation factors.

Each frequency bin result of linear combiner 124 is a correlation that is compensated by a different CFO value. These CFO values correspond to the possible CFO settings for the demodulator, but the CFO settings could be more limited that the possible CFO settings. For example, for some frequencies and modulation factors, there may be CFO settings that are too large and must not be used, although linear combiner 124 could still check these over-limit CFO values, although their results are ignored. Decision logic 126 could be configured to ignore the frequency bit results for the widest CFO settings, and only examine the narrower frequency bins. For example, $R_3(n)$ and $R_4(n)$ could be ignored in some modes, while only $R_0(n)$, $R_1(n)$, and $R_2(n)$ are examined by maximum selector 60. $R_{Q,2}(n\text{-OSR}/4)$ and $R_{I,2}(n\text{-OSR}/4)$ may be used to enhance performance and may be optional and omitted. For a 3 frequency-bin system, $R_{Q,2}(n\text{-OSR}/4)$ and $R_{I,2}(n\text{-OSR}/4)$ also can enhance SNR. Two of the five values $R_0(n)$ to $R_4(n)$ can be omitted for a 3-frequency-bin system.

The number of frequency bins could match the number of possible settings, or there could be more possible settings than frequency bins, where the magnitude of the excesses over the thresholds are used to select from a subset of settings that are proximate to the peak frequency bin. The frequency bins can correspond to hypothesis values of CFO that are being tested for by cross-product phase calculator 120 and complex binary correlator 122. The hypothesis CFO setting for the frequency bin with the highest result value is used to set the bit sync in the demodulator for the rest of the frame.

Any or all of cross-product phase calculator 120, complex binary correlator 122, linear combiner 124, and decision logic 126 may examine all bits in the received bitstream, or only the frame's preamble, and may be triggered to operate only at the start of a new frame, such as by reception of a valid a frame-start, and powered down or idle until the next frame preamble or synchronization sequence. CFO could be adjusted for each new frame, or could be adjusted less frequently, such as for every 10 frames, or only when errors increase above a threshold, such as signaled by downstream error-correction code (ECC) logic.

The samples input to cross-product phase calculator 120 could be the first sample for each symbol, or the first sample for each half-symbol, or have some other sampling ratio. The sampling ratio of cross-product phase calculator 120 does not have to be the same as the over-sampling ratio or of the sampling ratio of demodulator 110. Cross-product phase calculator 120 could sample the input at a higher or lower sampling frequency than used by demodulator 110. While OSR/2 and OSR/4 have been described as cross-product time-intervals, these values are mainly determined by the modulation factor. The interval between the two samples used in the cross-product ideally should make the absolute sine value as large as possible. The absolute phase difference of the two samples ideally should be as close as possible to $+\pi/2$. To enhance SNR, the second correlation value should be independent with the first correlation value (OSR interval), and be as close as possible to $+\pi/2$. So the selection of OSR/2 is a tradeoff between independence and a large enough interval. For most systems OSR and OSR/2 are proper selections.

The number of bits in the frame-start bit-sequence may be larger than shown. For example, there may be 128 bits 10101 . . . 1010 in the frame-start bit-sequence, and sine sign-bit buffer 36 and cosine sign-bit buffer 38 store 128 bits each. complex binary correlator 122 may operate quickly to accumulate results so that full 128-bit buffers are not needed. The frame-start bit-sequence may not be at the very start of the frame, but may be preceded by various other sequences, fields, or patterns in a preamble.

Local reference 46 may generate the sequence of bits for the local reference rather than store all bits. Local reference 46 may be a generator that toggles a bit at each half period of the symbol clock an retain or repeat that bit for the number of periods of the sampling clock equal to the OSR. For example, a 16 M sampling clock and a 1 M symbol clock can have local reference 46 toggle its bit every 16 periods of the 16 M clock. Local reference 46 may also be a register that stores the frame-start bit-sequence, either at the symbol rate or at the sampling rate, or at some other rate, that is then converted to the sampling rate for correlation by complex binary correlator 122. While a symbol clock has been described for greater ease of understanding, there may not be a physical clock that is a symbol clock in a real system. The system can operate with the faster sampling clock and does not need to generate a symbol clock.

While the term clock has been used, this term may refer to data rates and changes that are not exactly synchronized to a physical clock signal. Upsampling and downsampling may occur and a variety of clock rates, periods, and signals may be used. The received data stream may be synchronized to circuitry in the transmitter and a lock receiver clock only approximates this data stream for sampling or extracting data values.

Various modulation schemes may be used, such as Frequency-Shift Keying (FSK), Gaussian FSK (GFSK), where sharp edges are filtered by a Gaussian FIR, or other filter to smooth sharp edges. Other kinds of Continuous Phase Modulation (CPM) could be substituted, using phase difference to represent data bits.

While FSK modulation has been described, phase modulation or phase and frequency modulation may also be used, such as GFSK, Minimum Shift Keying (MSK), etc. Since phase and frequency are related, as frequency is the time derivative of phase, a frequency difference can also have a phase difference.

Various modulation, framing, and timing adjustments may be supported, such as using different over-sampling ratios, different frequencies, carrier waves, frame-start bit-sequences, samples per symbol, or bits per symbol. Symbols can be binary or can have 4 or more bits per symbol.

The detector may be used for various protocols and standards, such as Bluetooth Low-Energy (BLE), or standards using CPM class modulation.

The frequency bin thresholds TH0 to TH4 can be programmable or adjustable. They may be determined mainly by OSR and target SNR sensitivity. The larger the OSR is, the higher the thresholds. The lower the target SNR sensitivity is, the lower the thresholds.

Other arrangements and combinations of the blocks could be used. Additional steps and functions could be added. Deeper or shallower pipelines could be substituted. Also, various initialization and start-up procedures could be added.

The system of FIG. 2 can be pipelined. All modules 120, 122, 124, 126 can operate in parallel at the same time. For example, when a new sample is input, cross-product phase calculator 120 calculates a new pair of values, the sign bits of which are stored in the I and Q sign-bit buffers 36, 38. At the same time, complex binary correlator 122 completes correlation upon several sign-bits prior to the newly generated sign-bits of the new sample. At the same time, linear combiner 124 completes the processing of correlation outputs. Decision logic 126 asserts a result based on the outputs of linear combination.

Cross-product phase calculator 120 and linear combiner 124 could be duplicated, so that OSR (symbol) and OSR/2 (half-symbol) time-difference-interval sampling can be performed in parallel. Alternately, cross-product phase calculator 120 and complex binary correlator 122 could operate at a higher speed than other blocks in a pipeline. In particular, linear combiner 124 may be slower to calculate its results than cross-product phase calculator 120 or complex binary correlator 122.

Symbol sizes could be adjusted and standards could change. The number of symbols in a frame, and samples in a symbol, may be varied, as can the size and use of cyclic prefixes and guard intervals. Various data transmission rates and bandwidths may be provided for.

While cross-product phase calculator 120, complex binary correlator 122, linear combiner 124, and decision logic 126 are hardware blocks, some or all of these functions could be implemented in firmware or software on a DSP. Various digital processing routines could be used to perform filtering and other signal processing tasks. Control of the hardware blocks could use software or firmware, and parameters values such as the frequency-bin thresholds could be programmable or adjustable, and calibration routines could be performed to set these parameters for a specific implementation and environment.

Storing only the sign bits in Q sample buffer 34 and sine sign-bit buffer 36 may introduce a loss in the Signal-to-Noise Ratio (SNR). SNR might be improved by storing 2 MSB's per sample, such as the sign bit and the next MSB, but complexity would be increased. It is though that SNR is reduced by about 2 dB due to truncation of the cross-products to the sign bits.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line, or wireless signals.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:
1. A synchronizer comprising:
an In-phase (I) input and a Quadrature (Q) input derived from a received signal;
a first sample having a first I sample from the I input and a first Q sample from the Q input, wherein the first I sample and the first Q sample were generated from the received signal at a same first instant in time;
a second sample having a second I sample from the I input and a second Q sample from the Q input, wherein the second I sample and the second Q sample were generated from the received signal at a same second instant in time;
a cross-product phase calculator for generating a sine cross-product and a cosine cross-product of the first sample and of the second sample;
a sine sign-bit buffer for storing a Most-Significant-Bit (MSB) of the sine cross-product generated by the cross-product phase calculator as a sine sign bit;
a cosine sign-bit buffer for storing a MSB of the cosine cross-product generated by the cross-product phase calculator as a cosine sign bit;
a local reference generator that generates a local reference of a frame-start bit-sequence;
a complex binary correlator that compares a sequence of the sine sign bit from the sine sign-bit buffer to the local reference to generate a Q correlation result, and compares a sequence of the cosine sign bit from the cosine sign-bit buffer to the local reference to generate an I correlation result;
a full Q correlation result that is the Q correlation result generated when the first sample and the second sample are separated by one period of a symbol clock;
a half Q correlation result that is the Q correlation result generated when the first sample and the second sample are separated by one-half of the period of the symbol clock;
a full I correlation result that is the I correlation result generated when the first sample and the second sample are separated by one period of the symbol clock;
a half I correlation result that is the I correlation result generated when the first sample and the second sample are separated by one-half of the period of the symbol clock;
a linear combiner that combines the full Q correlation result, the full I correlation result, the half Q correlation result, and the half I correlation result to generate a plurality of linear combination results;
a peak detector that examines the plurality of linear combination results generated by the linear combiner and selects a maximum result from the plurality of linear combination results; and
a Carrier Frequency Offset (CFO) setting selector that selects a CFO setting having a CFO value that corresponds to the maximum result in the plurality of linear combination results;
wherein the CFO setting of the maximum result is sent to a down-mixer to adjust synchronization timing for extracting data from the received signal.

2. The synchronizer of claim 1 wherein each of the plurality of linear combination results corresponds to a different value of a CFO setting, wherein when the I input and the Q input are synchronized with an adjustment for a particular value of the CFO setting, and the received signal most closely corresponds to the adjustment of the CFO setting, then a linear combination result for the particular value of the CFO setting is larger than other linear combination results in the plurality of linear combination results, the other linear combination results in the plurality of linear combination results having CFO settings with values not matching the particular value of the CFO setting.

3. The synchronizer of claim 2 wherein the plurality of linear combination results further comprises:
a first linear combination result generated by adding the full Q correlation result and the half Q correlation result, the first linear combination result having a CFO setting of 0;
wherein a ratio of a rate of samples from the I input to a rate of data in the received signal and is an Over-Sampling Ratio (OSR);
a second linear combination result generated by adding the full Q correlation result and the half Q correlation result, and subtracting the full I correlation result and subtracting the half I correlation result, the second linear combination result having a CFO setting of $+\pi/4$; and
a third linear combination result generated by adding the full Q correlation result and the half Q correlation result and the full I correlation result and the half I correlation result, the third linear combination result having a CFO setting of $-\pi/4$.

4. The synchronizer of claim 3 wherein the plurality of linear combination results further comprise:
a fourth linear combination result generated by adding the half Q correlation result, and subtracting the full I correlation result and subtracting the half I correlation result, the fourth linear combination result having a CFO setting of $-\pi/2$; and
a fifth linear combination result generated by adding the half Q correlation result and the full I correlation result and the half I correlation result, the fifth linear combination result having a CFO setting of $-\pi/2$;
wherein the half I correlation result and the the full I correlation result have a time delay of OSR/4;
wherein the half Q correlation result and the full Q correlation result have a time delay of OSR/4.

5. The synchronizer of claim 2 wherein the complex binary correlator further comprises:
a sine multiplier for multiplying each sine sign bit from the sine sign-bit buffer with a bit from the local reference generator to generate a Q correlation bit;
a Q binary accumulator for accumulating the Q correlation bit from the sine multiplier for a sequence of sine sign bits to generate the Q correlation result;
wherein the Q correlation result is an indication of a degree of matching of a sequence of the sine sign bits with the local reference of the frame-start bit-sequence;
a cosine multiplier for multiplying each cosine sign bit from the cosine sign-bit buffer with a bit from the local reference generator to generate an I correlation bit; and
an I binary accumulator for accumulating the I correlation bit from the cosine multiplier for a sequence of cosine sign bits to generate the I correlation result;
wherein the I correlation result is an indication of a degree of matching of a sequence of the cosine sign bits with the local reference of the frame-start bit-sequence.

6. The synchronizer of claim 2 wherein the cross-product phase calculator further comprises:
a first multiplier for multiplying the second I sample and the first Q sample to generate a first product;

a second multiplier for multiplying the second Q sample and the first I sample to generate a second product;
a first summer for adding the first product and the second product to generate the sine cross-product;
a third multiplier for multiplying the second Q sample and the first Q sample to generate a third product;
a fourth multiplier for multiplying the second I sample and the first I sample to generate a fourth product; and
a second summer for adding the third product and the fourth product to generate the cosine cross-product.

7. The synchronizer of claim 6 wherein the sine sign-bit buffer discards Least-Significant-Bits (LSBs) of the sine cross-product, wherein only the MSB is stored in the sine sign-bit buffer as the sine sign bit;
wherein the cosine sign-bit buffer discards LSBs of the cosine cross-product, wherein only the MSB is stored in the cosine sign-bit buffer as the cosine sign bit.

8. The synchronizer of claim 2 wherein the peak detector further comprises:
threshold subtractors for subtracting a threshold from each of the plurality of linear combination results to generate a plurality of excess values indicating an excess over threshold;
wherein the peak detector selects the maximum result as a linear combination result having a maximum of the excess over threshold;
wherein each of the plurality of linear combination results has the threshold that is adjustable compared to threshold for other linear combination results in the plurality of linear combination results;
wherein the plurality of linear combination results are adjusted by thresholds.

9. The synchronizer of claim 8 wherein a Carrier Frequency Offset (CFO) estimate is generated from the maximum of the excess over threshold.

10. The synchronizer of claim 2 further comprising:
an I sample buffer for storing samples from the I input;
a Q sample buffer for storing samples from the Q input;
wherein the first sample and the second sample are read from the I sample buffer and the Q sample buffer.

11. The synchronizer of claim 2 wherein the local reference generator replicates the frame-start bit-sequence by copying an output bit OSR times for each period of the symbol clock, wherein OSR is an Over-Sampling Ratio;
wherein a frequency of the symbol clock is a maximum data rate of the received signal.

12. A Carrier Frequency Offset (CFO) detector comprising:
a sequence of samples generated from a received datastream, each sample in the sequence of samples having an In-phase I sample and a Quadrature (Q) sample;
a cross-product phase calculator generating a sine sign-bit and a cosine sign-bit from a first sample and a second sample in the sequence of samples;
wherein the sine sign-bit is a polarity bit of a sine function that includes the first sample and the second sample;
wherein the cosine sign-bit is a polarity bit of a cosine function that includes the first sample and the second sample;
a first correlator for correlating the sine sign-bit with a bit from a local reference of an expected frame-start bit-sequence to generate a first correlation bit;
a first accumulator for accumulating the first correlation bit over the expected frame-start bit-sequence to generate a Q correlation result;
a second correlator for correlating the cosine sign-bit with the bit from a local reference of the expected frame-start bit-sequence to generate a second correlation bit;
a second accumulator for accumulating the second correlation bit over the expected frame-start bit-sequence to generate an I correlation result;
a full Q correlation result that is the Q correlation result generated when the first sample and the second sample have a phase difference of one symbol;
a half Q correlation result that is the Q correlation result generated when the first sample and the second sample have a phase difference of half of one symbol;
a full I correlation result that is the I correlation result generated when the first sample and the second sample have a phase difference of one symbol;
a half I correlation result that is the I correlation result generated when the first sample and the second sample have a phase difference of half of one symbol;
a first summer for generating a first linear combination result generated by adding the full Q correlation result and the half Q correlation result, the first linear combination result having a CFO setting of 0;
wherein a ratio of a rate of samples to a rate of data in the received datastream and is an Over-Sampling Ratio (OSR);
a second summer for generating a second linear combination result generated by adding the full Q correlation result and the half Q correlation result, and subtracting the full I correlation result and subtracting the half I correlation result, the second linear combination result having a CFO setting of $+\pi/4$;
a third summer for generating a third linear combination result generated by adding the full Q correlation result and the half Q correlation result and the full I correlation result and the half I correlation result, the third linear combination result having a CFO setting of $-\pi/4$; and
a maximum selector for selecting the CFO setting of 0 when the first linear combination result is larger than other linear combination results, and for selecting the CFO setting of $+\pi/4$ when the second linear combination result is larger than other linear combination results, and for selecting the CFO setting of $-\pi/4$ when the third linear combination result is larger than other linear combination results.

13. The CFO detector of claim 12 further comprising:
a data extractor for extracting data from the received datastream;
wherein a receiver adjusts a phase of the data extractor by the CFO setting selected by the maximum selector to adjust for Carrier Frequency Offset (CFO) between a transmitter and the receiver.

14. The CFO detector of claim 13 further comprising:
a fourth linear combination result generated by adding the half Q correlation result, and subtracting the full I correlation result and subtracting the half I correlation result, the fourth linear combination result having a CFO setting of $+\pi/2$; and
a fifth linear combination result generated by adding the half Q correlation result and the full I correlation result and the half I correlation result, the fifth linear combination result having a CFO setting of $-\pi/2$;
wherein the maximum selector is further for selecting the CFO setting of $+\pi/2$ when the fourth linear combination result is larger than other linear combination results, and for selecting the CFO setting of $-\pi/2$ when the fifth linear combination result is larger than other linear combination results.

15. The CFO detector of claim 14 wherein OSR is at least 8.

16. The CFO detector of claim 13 wherein the cross-product phase calculator further comprises:
a first multiplier for multiplying a second I sample and a first Q sample to generate a first product;
a second multiplier for multiplying a second Q sample and a first I sample to generate a second product;
a first summer for adding the first product and the second product to generate a sine cross-product;
the first summer discarding lower significant bits in the sine cross-product to generate the sine sign-bit;
a third multiplier for multiplying the second Q sample and the first Q sample to generate a third product;
a fourth multiplier for multiplying the second I sample and the first I sample to generate a fourth product; and
a second summer for adding the third product and the fourth product to generate a cosine cross-product;
the second summer discarding lower significant bits in the cosine cross-product to generate the cosine sign-bit.

17. The CFO detector of claim 16 wherein the first correlator is a multiplier; and
wherein the second correlator is a multiplier.

18. A low-energy sync selector comprising:
an I sample buffer for storing In-Phase samples including a first I sample and a second I sample;
a Q sample buffer for storing Quadrature samples including a first Q sample and a second Q sample;
a first cross-product generator that multiplies the second I sample and the first Q sample to generate a first product, and that multiplies the second Q sample and the first I sample to generate a second product, and that adds the first product and the second product and discards lower significant bits to generate a sine sign-bit;
a second cross-product generator that multiplies the second I sample and the first I sample to generate a third product, and that multiplies the second Q sample and the first Q sample to generate a fourth product, and that adds the third product and the fourth product and discards lower significant bits to generate a cosine sign-bit;
a first complex binary correlator that multiplies the sine sign-bit by a bit from an expected framing sync sequence to generate a first correlation bit, and that accumulates successive generations of the first correlation bit to generate a Q correlation result;
a second complex binary correlator that multiplies the cosine sign-bit by the bit from the expected framing sync sequence to generate a second correlation bit, and that accumulates successive generations of the second correlation bit to generate an I correlation result;
a full Q correlation result that is the Q correlation result generated when the first Q sample and the second Q sample are separated by one period of a symbol clock;
a half Q correlation result that is the Q correlation result generated when the first Q sample and the second Q sample are separated by one-half of the period of the symbol clock;
a full I correlation result that is the I correlation result generated when the first I sample and the second I sample are separated by one period of the symbol clock;
a half I correlation result that is the I correlation result generated when the first I sample and the second I sample are separated by one-half of the period of the symbol clock;
a linear combiner that combines the full Q correlation result, the full I correlation result, a half Q correlation result, and a half I correlation result to generate linear combination results that include:
a first linear combination result having a maximum value when a Carrier Frequency Offset (CFO) between a transmitter and a receiver is zero;
a second linear combination result having a maximum value when the CFO between the transmitter and the receiver is $+\phi$, wherein $\phi$ is a phase difference;
a third linear combination result having a maximum value when the CFO between the transmitter and the receiver is $-\phi$;
a fourth linear combination result having a maximum value when the CFO between the transmitter and the receiver is $+2\phi$;
a fourth linear combination result having a maximum value when the CFO between the transmitter and the receiver is $-2\phi$; and
a maximum selector that determines a maximum of the first, second, third, fourth, and fifth linear combination results and sets a receiver CFO setting to the CFO for the maximum.

19. The low-energy sync selector of claim 18 wherein $\phi$ is a phase difference between a sine function that represents the I samples and a cosine function that represents the Q samples.

20. The low-energy sync selector of claim 18 wherein $\phi$ is one-eighth of a period of the symbol clock for data represented by the I samples and the Q samples.

\* \* \* \* \*